United States Patent [19]
Pedersen et al.

[11] 3,751,859
[45] Aug. 14, 1973

[54] FORAGE HARVESTER KNIFE SHARPENER WITH A ROTARY ABRASIVE WHEEL

[75] Inventors: Poul K. Pedersen, Blue Ball; Robert A. Wagstaff; Thomas W. Waldrop, both of New Holland, all of Pa.

[73] Assignee: Sperry Rand Corporation, New Holland, Pa.

[22] Filed: Sept. 24, 1971

[21] Appl. No.: 183,391

[52] U.S. Cl. ................................................. 51/249
[51] Int. Cl. ............................................ B24b 19/00
[58] Field of Search ...................... 51/246, 247, 249

[56] References Cited
UNITED STATES PATENTS

| | | | |
|---|---|---|---|
| 2,245,968 | 6/1941 | Erdman | 51/249 |
| 1,807,975 | 6/1931 | Eyres | 51/249 |

*Primary Examiner*—Othell M. Simpson
*Attorney*—John C. Thompson, George C. Bower et al.

[57] ABSTRACT

A forage harvester knife sharpener having two shafts parallel to the cutterhead for slideably supporting a carrier with an abrasive wheel rotatably mounted therein and driven from the forage harvester drive. One shaft being fixed, and the carrier being pivotally and laterally slideable thereon while the other shaft, being on the other side of the abrasive wheel from the fixed shaft, being adjustably mounted in a rigid frame for moving the abrasive wheel to and from the cutter-head to grind cutting bevels and relief bevels on the knives.

13 Claims, 9 Drawing Figures

INVENTOR
POUL KINGO PETERSON
ROBERT A. WAGSTAFF
THOMAS W. WALDROP

By George C. Bower ATTORNEY

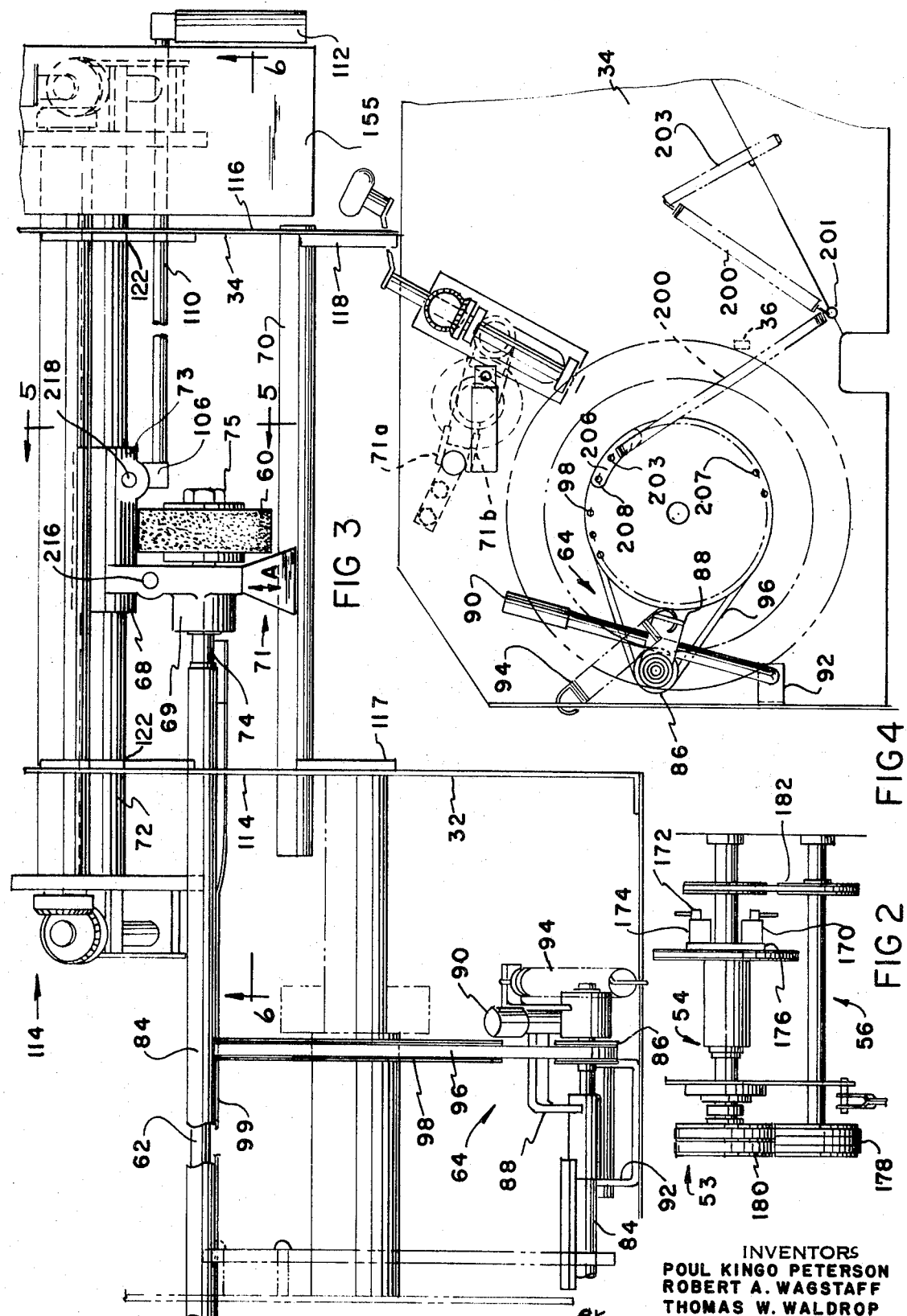

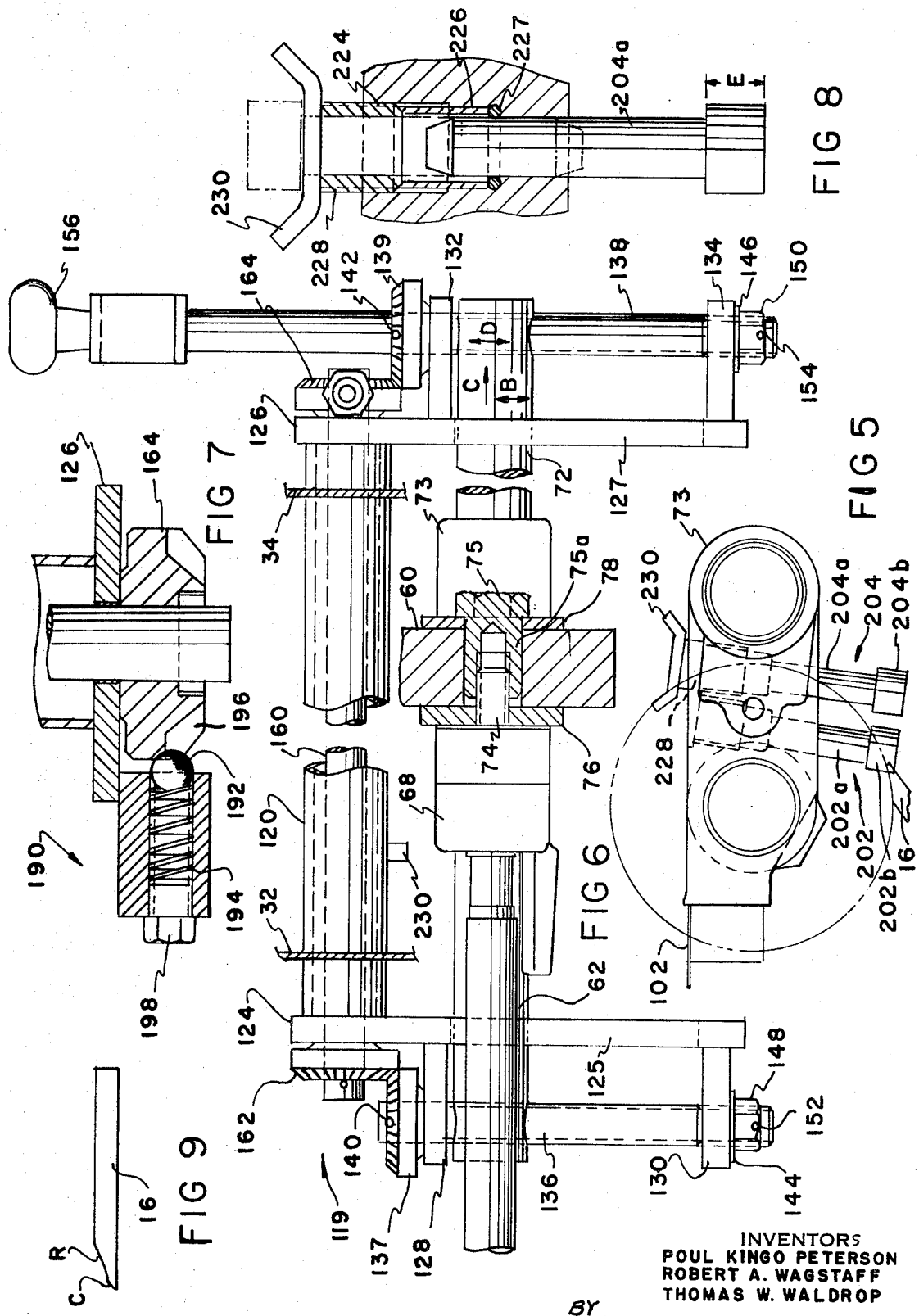

FORAGE HARVESTER KNIFE SHARPENER WITH A ROTARY ABRASIVE WHEEL

FIELD OF THE INVENTION

This invention relates to the sharpening of knives on a cutterhead of a forage harvester and is directed particularly to power driven sharpeners for the grinding of the cutting bevels and the relief bevels of the knives.

BACKGROUND OF THE INVENTION

Forage harvesters of the reel type have a rotating cutterhead with a plurality of longitudinally extending, circumferentially spaced knives. The knives chop crop material in cooperation with a shear bar extending parallel to the cutterhead. For proper chopping of the crop material, the knives should be sharp and the clearance with the shear bar should be maintained within a given range. How often the knives need to be sharpened depends on the amount of use of the forage harvester, the cleanliness of crop being chopped and the desired type of chopped crop produced by the harvester. The knives may be removed from the cutterhead, sharpened and replaced on the cutterhead. This is time consuming and requires the setting of each knife in relation to the shear bar. Another method, which is preferable, is to mount an abrasive stone of the forage harvester and resharpen the knives in position on the cutterhead. This may be done with the knives stationary and each knife individually sharpened or by rotating the cutterhead and grinding the knives so that they each subscribe the same cutting cylinder. The drawback of these methods is that the cutting bevel is as thick as the knife. A thinner cutting bevel is needed to properly chop a crop material. Further, the thick bevel reduces the efficiency of the machine. By providing relief at the heel of the cutting bevel, the efficiency of the machine is increased. This relief can be obtained by grinding the cutting bevel at a lesser angle with the knife than the cutting bevel conforming to the cutting cylinder. The lesser angle provides clearance between the heels of the knives and the shear bar. Presently this type of bevel is formed by a power driven abrasive wheel on the forage harvester which grinds the knives individually. There are several shortcomings to this method of grinding a cutting bevel with a relief. One is that the cutting edge is thin and more easily dulled or chipped. A further disadvantage is that the cutting knives are individually ground and, therefore, have different cutting cylinders. This may be minimized by laboriously grinding a small amount from each knife and repeating this several times around the cutterhead so that all the knives of the cutterhead will be ground about the same amount and approximately subscribe the same cylinders. The disadvantage of this method is that it is time consuming. Therefore the procedure in actual practice is to grind each knife once and accept the drawback of the knives having different clearances with the shear bar. Another disadvantage is that the grinding stone and driving electric motor have to be mounted on the forage harvester each time the knives are sharpened. Also the process is dependent on electric power which is usually only available at the barn or the like. Thus it is not possible to grind in the field. Some harvesting conditions wear the knives severely and require frequent resharpening. Therefore under such conditions regrinding in the field is preferable but impossible using prior devices.

OBJECTS OF THE INVENTION

An object of this invention is to provide a forage harvester knife sharpener that grinds a cutting bevel with each cutting edge subscribing the same cutting cylinder and which grinds relief bevels without removing the knives from the cutterhead.

Another object of the invention is to support the abrasive wheel of the inife sharpener so that it can be moved inwardly to properly grind the relief bevel.

Another object of the invention is to firmly mount the grinding wheel on the forage harvester so that variations in the abrasive wheel are minimized.

Another object of the invention is to drive the abrasive wheel from the forage harvester drive.

These and other objects and advantages of this invention will be apparent from the specification and claims taken in connection with the accompanying drawings which illustrate the various features of this invention.

SUMMARY OF THE INVENTION

In a forage harvester having a cutterhead rotatably mounted on a forage harvester frame, and having longitudinally extending knives circumferentially mounted around the cutterhead, a knife sharpener having an abrasive wheel rotatably mounted on a carrier slideably mounted on two shafts parallel to the cutterhead and on opposite sides of said carrier, one of the shafts being fixed, and the carrier being pivotally and laterally slideably mounted thereon, and the other shaft being adjustably mounted on a bracket means firmly holding the adjustable shaft longitudinally and laterally and in the direction of adjustment, the carrier being pivotally mounted on the fixed shaft and adjustable shaft to set the abrasive wheel for grinding the cutting bevels on the knives during rotation of the cutterhead, and to properly grind the relief bevels over a range of abrasive wheel diameters.

BRIEF DESCRIPTION OF THE DRAWINGS

FIG. 2 illustrates the reversing drive.

FIG. 3 is a top view of the knife sharpener and the drive rotating the abrasive wheel.

FIG. 4 is a right side view of the forage harvester.

FIG. 5 is a view of the knife sharpener taken along line 5—5 of FIG. 3.

FIG. 6 is a sectional view taken along line 6—6 of FIG. 3.

FIG. 7 is a sectional view of the indexing detent.

FIG. 8 is a sectional view of one of the holders for the guide pin.

FIG. 9 is a sectional view of a knife illustrating the relationship of the bevels.

DETAILED DESCRIPTION OF THE PREFERRED EMBODIMENT

Figure 1:
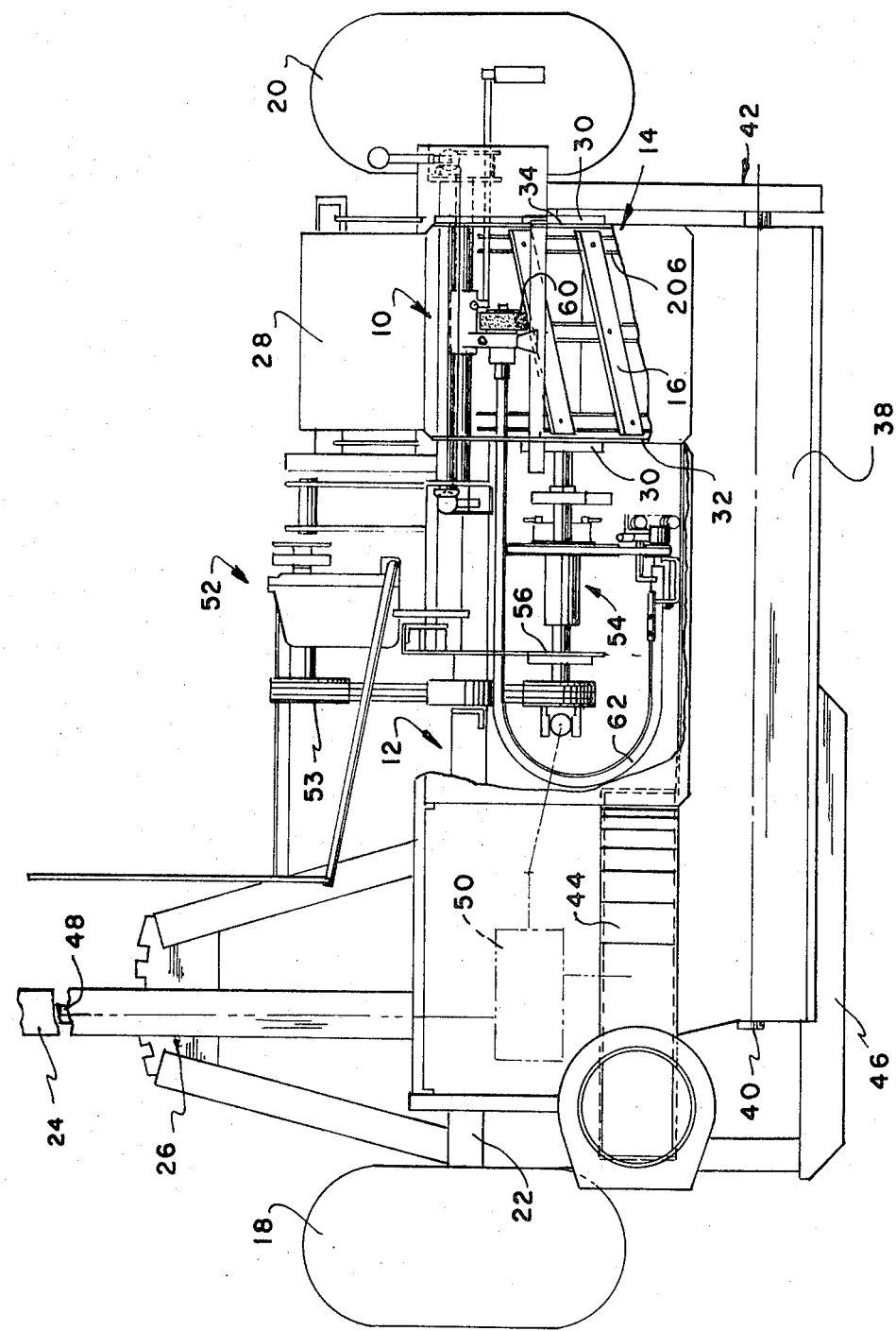
FIG. 1 is a top view of the forage harvester with the shielding above the cutterhead removed to illustrate the cutterhead and power knife sharpener and the shielding for the forage harvester drives broken away to show the flexible drive for the abrasive wheel.

The new and novel knife sharpener 10 is mounted on the main frame 12 of a cutter type forage harvester above the forward portion of the cutterhead 14 to grind cutting and relief bevels in the cutterhead knives. The forage harvester is of the pull type and is generally illustrated in FIG. 1 of the drawings. At the ends of the transverse main beam 22 forming part of the main frame 10 are left and right wheels 18, 20. At the left end is a forwardly extending hitch 24 pivotally connected to the main frame and supported by the hitch frame 26. At the right end is the feed roll mechanism 28 receiving the crop from a header or row crop attachment (not shown) and feeding it rearwardly to the following cutterhead 14. The cutterhead is rotatably mounted in bearings 30 on the outer side of the side walls 32, 34 to chop the crop in cooperation with the shear bar 36 (FIG. 3) contained in the comminuting chamber formed by the side walls 32, 34. The chopped crop is discharged from the rear and transversely conveyed across the back of the forage harvester in a trough 38 by an auger 40 driven by the belt and pulley drive 42 on the right end of the forage harvester, and fed to the blower 44 for delivery to a trailing wagon (not shown) connected to the hitch bar 46. The rotative power is transferred from the tractor power takeoff by the drive shaft 48 through a right angle gearbox 50 to the cutterhead drive 54. The feed roll drive 52 is connected to the cutterhead drive by the belt and pulley drive 53. The cutterhead drive 54 includes a reversing drive 56 more fully described herein. This drive rapidly rotates the cutterhead in the reverse direction on the sharpening of the cutting bevel on the knives. The knife sharpener is in the upper forward part of the comminuting chamber above the forward part of the cutterhead and has a rotary abrasive wheel 60 driven by the cutterhead drive 54.

The knife sharpener 10 is more fully shown in FIGS. 3-7. FIG. 3 illustrates an overall view of the knife sharpener and drive means for the abrasive wheel. Considering the specific features of the knife sharpener 10, as shown in FIGS. 3, 4 and 5, the abrasive wheel 60 is rotatably mounted on the connecting portion 69 of the L-shaped carrier 68 which is slideably mounted on the fixed shaft 70 by a yoke portion 71 and on the adjustable shaft 72 by a cylindrical portion 73. This connection allows the wheel 60, to move across the comminuting chamber to gring the cutting bevels C and relief bevels R (FIG. 9) on the knives of the cutterhead.

First, the mounting of the abrasive wheel and the cable drive will be described. The circular abrasive wheel is attached to the drive shaft 74 by the nut 75 with a shaft portion 75a fitting in the center of the wheel. The nut presses the circular plates 76 and 78 against the opposite sides of the wheel. The abrasive wheel, thus, is firmly held by the plates and the nut to rotate with the shaft 74. The shaft 74 is connected by the flexible cable 62 to the small driven pulley 86 of the belt and the pulley drive 64. The pulley 86 and the end of the sheath 84 are mounted in the bracket 88 attached to the handle 90 which is pivotally mounted in the lower bracket 92 fixedly attached to the wall of the housing below the pulley 86. The bracket 88 is resiliently connected to the wall of the housing by the helical spring 94 which holds the belt 96 of the belt and pulley drive 64 taut for the driving of the pulley 86 by the large sheave 98 on the cutter drive 54. The handle 90 is pushed towards the sheave 98 to overcome the pull of the spring 94 and render the belt 96 slack so that the belt 96 may be mounted or removed from the sheaves 86 and 98. The belt 96 is connected when it is desired to rotate or drive the abrasive wheel 60. A particular feature of the abrasive wheel drive is the long U-shaped spring metal strap 99 extending the length of the cable. The strap is stiff in one lateral direction and flexible in the other to support the cable in an 180° arc. At one end the cable is attached to the carrier and at the other end to the bracket 88.

As previously mentioned the carrier has a yoke portion 71 and a cylindrical portion 73 with connecting portion 69 therebetween. The yoke portion 71 has flat plate-like fingers 71a, 71b fitting above and below the fixed shaft 70 so that the yoke portion pivots around the shaft 70 and shifts laterally along the shaft. Another feature is that the yoke portion 71 shifts laterally slightly in the direction of the arrow A to accommodate to the change in distance between the adjusting shaft and the fixed shaft as the adjusting shaft moves. The clearance between the yoke portion 71 and the shaft 70 are set by shims 102 mounted on the upper finger 71a of the yoke portion. This clearance is very close and only sufficient to permit the sliding and pivotal movement of the yoke portion.

On the other side of the carrier the cylindrical member 73 fits around the cylindrical adjustable shaft 72 in pivotal relation therewith. The cylindrical portion 73 extends along the shaft 72 and on the forward side of the abrasive wheel in relation to the reverse rotation of the cutterhead. The boss 106 on the cylindrical portion has a threaded opening for receiving the actuating rod 110 extending exteriorly to the right side of the forage harvester. The rod 110 has a handle 112 mounted at right angles thereon for sliding the carrier and abrasive wheel back and forth along the cutterhead during the grinding operation. The side walls 32 and 34 have openings 114 and 116 through which the adjusting shaft 72 extends for permitting the carrier 68 to move through and beyond the respective side walls when at that side of the comminuting chamber. The knives extend from wall to wall with the ends of the knives adjacent the inside surfaces of the walls. The travel of the carrier through the walls insures that the abrasive wheel fully traverses length of the knives.

The shaft 70 is a rigid steel rod with a cylindrical shape which extends beyond the wall 32 through the opening 114 so that the yoke portion 71 and the carrier 68 may extend outside of the left wall 32. Since the yoke portion is to the left of the abrasive wheel it need not pass through the right opening 116 for the abrasive wheel to be positioned immediately outside the wall 34.

Shaft 70 does not move and is welded to the brackets 117 and 118 which are securely bolted to the inner surfaces of the walls 32 and 34. The rigidity of the shaft and the close clearance of the yoke portion aids in preventing the abrasive wheel from vibrating by holding the wheel to a minimum of play when moved in cooperation with the adjusting shaft.

A particular feature of this knife sharpening device is the mounting means of the adjustable shaft 72. The shaft is firmly held by the bracket means 119 so that the shaft does not move longitudinally in the direction of the arrow B (FIG. 3) or laterally in the direction of the arrow C (FIG. 5). This bracket means also firmly holds the ends of the adjustable shaft in the threaded shafts which adjustably move the shaft 72 in the direction D (FIG. 6). The mountings of these threaded shafts are part of the bracket means 119. The main member of this bracket means is the tubular beam 120 extending through the walls 32, 34 and welded thereto at 122 to securely and rigidly fasten the beam to the frame of the forage harvester. The ends of the tubular beam, which in this embodiment has a cylindrical shape, has downwardly extending plates 124 and 126 welded to the respective ends of the beam 120. Welded to plate 124 are mounting plates 128 and 130 spaced in relation above and below opening 125. Similarily, mounting plates 132, and 134 are welded to plate 126 above and below opening 127. The mounting plates 128 and 130 rotatably carry threaded shafts 136 while mounting plates 132, and 134 carry shaft 138. These shafts are firmly held against longitudinal movement, at the upper ends, by the bevel gears 137 and 139 fixedly secured to upper portion of the shafts by the respective pins 140 and 142 and, at the lower ends of the shafts, by washers 144 and 146 and nuts 148 and 150. The nuts are locked to the shafts by pins 152 and 154, respectively. The threaded shaft 138 extends upwardly, as shown in FIGS. 3 and 4, above the shield 155 and the upper edge of the side wall 34. A knobbed handle 156 is mounted thereon for rotating the shaft. The bevel gear 139 is coupled to gear 164 so that when gear 139 is activated, by movement of the handle 156, motion will be imparted to shaft 160 through gear 164. The motion of shaft 160 is imparted to shaft 136 through the gears 162 and 137. The couplings of the bevel gears 139 and 164 and of the bevel gears 136 and 162 have very close tolerances so that the shafts 136 and 138 move both ends of the adjustable shafts 72 simultaneously the same amount. The threads of the shafts 136 and 138 mesh with the threads with the adjustable shaft so that practically no play or movement is present between the adjustable shaft 72 and the shafts 136 and 138. The forces on the shaft 72 are transmitted to the mountings plates 128, 130 and 132 and 134 respectively, which are rigidly secured to the walls 32 and 34. Thus, the adjustable beam 72 is securely held against movement in any direction except the movement provided by the rotation of the threaded shafts 136 and 138.

The close clearance between the yoke portion 71 and the fixed shaft 70 restricts the carrier to a minimum lateral movement. The minimization of the movement of these supporting members permits the cylindrical member 73 to have a clearance with the shaft 72 for the passage of debris. The movement of the abrasive wheel 60 is minimized by mounting said wheel between the cylindrical member 73, and the yoke portion 71. Once the movement of the yoke portion is minimized the movement of the cylindrical member 73 is reduced substantially. With the various movements and plays minimized the normal clearances of the ball bearing may be tolerated and precision grinding attained.

This grinding by the powered knife sharpener properly forms cutting bevels and relief bevels. The cutting bevel is reformed many times for the reforming of the relief bevel. As illustrated in FIG. 9, the concave relief bevel thins the portion of the knife carrying the cutting bevel. When the grinding of the cutting bevel has substantially reduced the relief bevel and the thickness of the cutting bevel exceeds the desired range of thickness of the cutting bevel, the relief bevel is reformed. This reduced thickness of the knife provided by the relief bevel greatly reduces the time of resharpening of the knives since the length of time for grinding is generally proportional to the width of the cutting bevel. This generally makes it easier to maintain the knives in proper condition.

In this embodiment of the forage harvester the cutting bevels are formed by rotating the cutterhead 14 in reverse. The cutterhead drive 54 is disconnected by withdrawing the pins 172 of the detachable coupling 170 connecting two portions of the cutterhead drive. The pins 172 are slideably mounted in blocks 174. The pins fit into the plate 176 for driving the cutterhead forwardly. On disconnecting pins 172 from the plate 176 the cutterhead is free to rotate and is reversely driven by actuating the roll 178 of the reversing drive into engagement with the pulley 180 of the belt and pulley drive 53 connected to the feed roll drive. The belt and pulley drive 182 then rotates the cutterhead in reverse.

The abrasive wheel drive is connected, while the forage harvester is stopped, by placing the belt 96 on the sheaves 86 and 98. The sheave 98 is on the other side of the detachable coupling from the cutterhead. When the forage harvester again starts the abrasive wheel will rotate.

The carrier 68 is moved over the reversely rotating blades and slowly lowered by turning the handle 156 until the abrasive wheel and knives engage. The abrasive wheel is then moved back and forth across the cutter-head slowly indexing the handle 156 to move the carrier 68 downward after each pass. The amount of indexing of the wheel is judged by the clicks of the detent 190 mounted on the plate 126. The detent has a spherical ball 192 loaded by the helical spring 194 positioned to drop into the notches 196 of the gear 164. The compression of the spring is set by the screw 198. Thus, the movement of the abrasive wheel is measured by audible clicks. When sufficient grinding has been performed the machine is stopped and the cutting bevels inspected. The shear bar 36 is then repositioned to conform to the new cutting cylinder of the knives.

The relief bevels are ground on each individual knife. The cutterhead is not driven but is pulled by a spring 200 against pins 202 and 204 mounted in sockets in the carrier. This positions the knife in relation to the abrasive wheel. The linear movement of the carrier on the shafts 70 and 72 will cause the cutterhead to turn for properly position the knife under the abrasive wheel.

The spring 200 is connected at the lower end 201 to the frame and at the upper end to a pin or shaft 203 fitting in the right end plate 206 of the cutterhead. The cutterhead has a circular row of holes 207, one for each knife. The pin or rod is inserted into one of the holes through an arcuate slot 208 in the side wall 34 of the forage harvester. The slot extends over an arc corresponding to the movement of the knife as the carrier moves from side to side.

When the relief bevels are not being ground the spring 200 and pin 203 are attached to the forage harvester in the storage position shown by the dash-dot lines of FIG. 4.

The carrier 68 has two pin sockets 216 and 218 extending through the carrier for the guide pins 202 and 204. For storage, the pins are inserted in the top of the carrier and extend upwardly. When the relief bevel is formed the guide pins are inserted from the bottom side and extend downwardly for engagement by the cutting edge of the knife.

The guide pins 202 and 204 have cylindrical stem portions 202a and 204a fitting in the sockets and cylindrical rollers 202b and 204b. The head portions engage the cutting edge to position the knife and stone. In order to assure the spiral contour of the sockets 216 and 218 are at an angle to the shafts 70, 72 the sockets are skewed to one another. Thus the pins project at different angles from the carrier. The function of these pins is not only to position the knife in relation to the abrasive wheel but also to compensate for the wear of the abrasive wheel and knives to substantially grind the relief bevel at the same place on each knife. The cylindrical portions 202b, 204b are positioned at the bottom of the grinding wheel and are engaged by the knife edge. The axes of the sockets are set so that as the wheel diameter is reduced with wear, the rollers will be positioned at locations to place the abrasive wheel in relation to the knife for the grinding of a proper relief bevel as shown in FIG. 9.

The sockets 216 and 218 are structurally similar and the following description of socket 218, also applies to socket 216. As shown in FIG. 8, the carrier has a stepped 224 with lowest portion corresponding to the diameter of the cylindrical stem 204a. An intermediate portion has a tubular member 226 with an inside diameter slightly greater than the diameter of the stem. An O-ring 227 is seated at the bottom of the intermediate portion and pressed against the stem by the threaded tubular member 228 having an inner diameter about the same as the diameter of the stem. The tubular member has threads on the outer surface meshing with threads on the wall of the largest portion above the intermediate portion. The tubular member 226 extends into the largest portion to engage the tubular member 228. The tubular member 228 has winged grips 230 for tightening and loosening. The guide pin is in the operative position when inserted from the bottom. The tubular member 228 is tightened and the O-ring 227 grips the stem. For storage the guide pin is inserted through tubular member 228 in the dot-dash position shown in FIG. 8. The tubular member 228 is again tightened to hold the pins in the carrier.

The carrier with the abrasive wheel is stored by moving the carrier to the left and adjusting the shaft to its uppermost position. The carrier is moved to the left and the adjusting shaft is raised to the uppermost position. A projection 230 extends downwardly from the tubular beam 120, and functions as a stop to prevent the rod 110 and handle 112 from being drawn outside of the casing when the knife sharpener is not being operated.

It is thus seen from the foregoing description, that the carrier on which the abrasive wheel is mounted can be securely held so as to avoid all but minimal movement during the grinding operation thereby allowing proper shaping of the knives. The cylindrical portions of the device hold the abrasive wheel laterally while the elongated slot structure of the yoke provides close clearances while moving the abrasive wheel either inwardly or outwardly. This structure with the firm adjustable mounting 119 serves to minimize any play or movement of the adjustable shaft. This provides a sturdy, firm and stable support for the abrasive wheel.

While the invention has been described, it will be understood that it is capable of further modification and this application is intended to cover any variations, uses or adaptions of the invention following in general, the principles of the invention and including such departures from the present disclosure as come within known or customary practice of the art to which the invention pertains, and as may be applied to the essential features hereinbefore set forth and as are within the scope of the invention for the limits of the appended claims.

We claim:

1. In a forage harvester having
   a housing with spaced vertical side walls forming a comminuting chamber,
   a cutterhead rotatably mounted in said chamber between said walls,
   a plurality of longitudinally extending circumferentially arranged knives mounted on said cutterhead and subscribing a cutting cylinder on rotation of said cutterhead, and
   a shear bar mounted on said housing parallel to and adjacent the cutting cylinder in cooperative relation with said knives for chopping crop material;
   a knife sharpener comprising
   a fixed shaft extending between said side walls,
   a shaft parallel to said fixed guide shaft and spaced therefrom and adjustable towards and away from said cutterhead,
   a carrier positioned between said shafts having a first portion in a close clearance on said fixed shaft to slideably and pivotally hold said carrier on said fixed shaft while permitting lateral movement thereto and a second portion fitting around said adjustable shaft in slideable and pivotal relation therewith,
   an abrasive wheel rotatably mounted on said carrier with the axis of rotation parallel to the axis of rotation of said cutterhead, and
   means rigidly fastened to said housing and actuatably supporting said adjustable shaft in a linear movement to position said abrasive wheel over a range of positions for grinding cutting bevels on rotation of said cutterhead.

2. In a forage harvester as set forth in claim 1 wherein said fixed shaft is attached to said walls.

3. In a forage harvester as set forth in claim 1 wherein said fixed shaft is in a following position in relation to said adjustable shaft on the reverse rotation of said cutterhead.

4. In a forage harvester as set forth in claim 3 wherein said means rigidly fastened to said housing comprises frame means rigidly secured to said side walls and including threaded shafts at opposite ends of said adjustable shaft, said housing firmly supporting said threaded shafts longitudinally and laterally relative to said fixed shaft, said threaded shafts being operable to hold said adjustable shafts at a given setting.

5. In a forage harvester as set forth in claim 4 wherein means are provided for simultaneously rotating said threaded shafts to position said adjustable shaft, said carrier and said abrasive wheel.

6. In a forage harvester as set forth in claim 5 wherein said rotating means comprises a rotatable shaft extending across said housing between the ends of said threaded shafts, said rotatable shaft having bevel gears and each of said threaded shafts having bevel gears meshing with said rotatable shaft bevel gears, and wherein means are provided for rotating said rotatable shaft and said threaded shafts.

7. In a forage harvester as set forth in claim 1 wherein said first portion has spaced members on opposite sides of said fixed shaft and in close clearance therewith for minimum movement transverse to said members and has slot-like means between said members for permitting shifting of said first portion laterally to said transverse movement on the linear adjustment of said adjustable shaft.

8. In a forage harvester as set forth in claim 7 wherein said shafts are cylindrical and said first portion is U-shaped and said second portion is cylindrical.

9. In a forage harvester having
a housing with spaced vertical side walls forming a comminuting chamber,
a cutterhead rotatably mounted in said chamber between said walls,
a plurality of longitudinally extending circumferentially arranged knives mounted on said cutterhead and subscribing a cutting cylinder on rotation of said cutterhead, and
a shear bar mounted on said housing parallel to and adjacent the cutting cylinder in cooperative relation with said knives for chopping crop material;
a knife sharpener comprising
bracket means having a tubular beam extending between and through said walls and downwardly extending plates fixedly secured to said beam on the outer sides of said walls, respectively,
two threaded shafts rotatably mounted on said respective plates in secure longitudinal and lateral relation thereto,
a connecting shaft extending through said tubular beam and means on said threaded shafts and said connecting shafts coupling said shafts with a minimum of play,
a cylindrical adjustable shaft meshing with said threaded shafts and movable towards and away from said cutterhead upon rotation of said threaded shafts,
a fixed shaft parallel to said adjustable shaft and spaced therefrom,
a carrier having an abrasive wheel rotatably mounted thereon, a cylindrical member rotatably disposed about said adjustable shaft and longitudinally slidable thereon, and a yoke portion rotatably and longitudinally slideable on said fixed shaft in close clearance with said fixed shaft for minimal lateral movement transverse to the plane through said fixed and adjustable shafts and substantial lateral movement longitudinal to the aforesaid plane to accommodate for change in the space between said shafts on adjustment while stably holding said abrasive wheel at a given grinding position.

10. A knife sharpener for the cutterhead of a forage harvester comprising
two spaced shafts extending parallel to one another and said cutterhead, one of said shafts being adjustable,
a carrier between said shafts having a rotary abrasive wheel, means rotatable and longitudinally slideable on one of said shafts and having means rotatable and longitudinally slideable on said other shaft and laterally movable in the plane through said shafts while in close clearance transversely to the plane through said shafts, and
means for adjustably and firmly supporting said adjustable shaft in linear movement towards and away from said cutterhead to stably hold said abrasive wheel in a given grinding position.

11. In a forage harvester having
a frame,
a housing on said frame and with spaced vertical side walls forming a comminuting chamber,
a dirve,
a cutterhead rotatably mounted in said chamber between said walls and rotated by said drive,
a plurality of longitudinally extending circumferentially arranged knives mounted on said cutterhead and subscribing a cutting cylinder on rotation of said cutterhead, and
a shear bar adjustably mounted on said housing parallel to and adjacent the cutting cylinder in cooperative relation with said knives for chopping crop material;
a knife sharpener comprising
an abrasive wheel,
means for slideably supporting said abrasive wheel parallel to said cutterhead in grinding relation therewith
abrasive wheel drive means spaced from said housing and coupled to said forage harvester drive,
means on said frame for supporting said abrasive wheel drive means,
a flexible drive cable extending between said abrasive wheel drive and said abrasive wheel, and
a thin strap being flexible in one lateral plane and stiff in the lateral plane perpendicular thereto, and being firmly attached at opposite ends and intermediately to said flexible cable to support said flexible cable.

12. In a forage harvester as set forth in claim 11 wherein said strap is connected to said slideable supporting means and said supporting means for said abrasive wheel drive means.

13. In a forage harvester as set forth in claim 11 wherein said flexible cable and strap are curved.

* * * * *